United States Patent
Nossik et al.

(10) Patent No.: US 10,609,066 B1
(45) Date of Patent: Mar. 31, 2020

(54) AUTOMATED DETECTION AND REMEDIATION OF RANSOMWARE ATTACKS INVOLVING A STORAGE DEVICE OF A COMPUTER NETWORK

(71) Applicant: EMC IP Holding Company LLC, Hopkinton, MA (US)

(72) Inventors: Misha Nossik, Ottawa (CA); Yuri Berfield, Ottawa (CA); Lejin Du, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 184 days.

(21) Appl. No.: 15/360,398

(22) Filed: Nov. 23, 2016

(51) Int. Cl.
*H04L 29/06* (2006.01)
*G06F 21/57* (2013.01)

(52) U.S. Cl.
CPC .......... *H04L 63/1441* (2013.01); *G06F 21/57* (2013.01); *H04L 63/1408* (2013.01); *H04L 63/20* (2013.01); *G06F 2221/034* (2013.01)

(58) Field of Classification Search
CPC . H04L 63/1416; H04L 63/12; H04L 63/1491; H04L 67/306
See application file for complete search history.

(56) References Cited

U.S. PATENT DOCUMENTS

| | | | |
|---|---|---|---|
| 9,317,686 B1* | 4/2016 | Ye | G06F 11/1461 |
| 2005/0114338 A1* | 5/2005 | Borthakur | G06F 16/10 |
| 2008/0016570 A1 | 1/2008 | Capalik | |
| 2008/0046997 A1* | 2/2008 | Wang | G06F 21/79 726/16 |
| 2009/0144823 A1 | 6/2009 | Lamastra et al. | |

(Continued)

FOREIGN PATENT DOCUMENTS

| | | | |
|---|---|---|---|
| EP | 3038003 A1 | 6/2016 | |
| GB | 2534459 A | 7/2016 | |
| KR | 20140033349 A * | 3/2011 | G06F 11/301 |

OTHER PUBLICATIONS

N. Scaife et al., "CryptoLock (and Drop It): Stopping Ransomware Attacks on User Data," 36th International Conference on Distributed Computing Systems, Mar. 12, 2016, pp. 303-312 Takabatake-cho, Nara, Japan.

(Continued)

*Primary Examiner* — Harunur Rashid
(74) *Attorney, Agent, or Firm* — Ryan, Mason & Lewis, LLP

(57) ABSTRACT

An apparatus in one embodiment comprises a storage device having a processor coupled to a memory. The storage device incorporates at least one trap object particularly configured for use in detection of a ransomware attack and not otherwise utilized for storage of operational data in the storage device. The storage device further comprises a ransomware detector configured to monitor the trap object and to generate an alert based at least in part on a result of the monitoring. The trap object may comprise a dummy file system element of the storage device, such as, for example, a file or a directory of a file system of the storage device. Additionally or alternatively, the trap object may comprise one or more specific storage blocks of the storage device with the one or more specific storage blocks being determined at least in part by the file system of the storage device.

20 Claims, 7 Drawing Sheets

(56) References Cited

U.S. PATENT DOCUMENTS

| | | | | |
|---|---|---|---|---|
| 2016/0164894 A1* | 6/2016 | Zeitlin | ................ | H04L 63/1416 |
| | | | | 726/23 |
| 2016/0323316 A1* | 11/2016 | Kolton | .................. | H04L 63/145 |
| 2017/0157407 A1* | 6/2017 | Zellmer | ................ | A61N 1/3787 |
| 2017/0308711 A1* | 10/2017 | Barak | ...................... | G06F 21/62 |
| 2018/0018458 A1* | 1/2018 | Schmugar | ............. | G06F 21/566 |
| 2018/0107824 A1* | 4/2018 | Gibbons, Jr. | ......... | G06F 21/565 |
| 2018/0139053 A1* | 5/2018 | Kadam | ................ | H04L 9/3247 |

OTHER PUBLICATIONS

U.S. Appl. No. 15/268,862 filed in the name of James L. Weaver et al. Sep. 19, 2016 and entitled "Automated Detection and Remediation of Ransomware Attacks Involving a Storage Device of a Computer Network."

\* cited by examiner

AUTOMATED DETECTION AND REMEDIATION OF RANSOMWARE ATTACKS INVOLVING A STORAGE DEVICE OF A COMPUTER NETWORK

FIELD

The field relates generally to computer networks, and more particularly to techniques for providing security in a computer network.

BACKGROUND

A computer network is typically configured to incorporate security functionality in order to protect the computers of the network against malicious activity. Such malicious activity can include, for example, ransomware attacks in which malware infecting one or more computers of the computer network will systematically encrypt files on those computers and possibly other computers of the network. The attacker withholds the corresponding decryption key unless a ransom is paid by the victim. Conventional techniques for combatting ransomware attacks can be problematic in that such techniques can take an unduly long amount of time to detect an attack in progress. The longer it takes to detect the attack, the greater the number of files that are encrypted, and the greater the adverse impact of the attack on the victim.

SUMMARY

Illustrative embodiments of the invention provide techniques for automated detection and remediation of ransomware attacks involving one or more storage devices of a computer network. For example, some embodiments are configured to provide particularly accurate and efficient detection of on-going ransomware attacks directly on a storage device rather than on associated user devices. One or more of these embodiments are illustratively configured to detect ransomware activity directly on a storage device rather than on a user device and without the need for behavioral analysis of any kind.

In one embodiment, an apparatus comprises a storage device having a processor coupled to a memory. The storage device incorporates at least one trap object particularly configured for use in detection of a ransomware attack and not otherwise utilized for storage of operational data in the storage device. The storage device further comprises a ransomware detector configured to monitor the trap object and to generate an alert based at least in part on a result of the monitoring.

By way of example, the trap object may comprise a dummy file system element of the storage device including one or more of a file, a directory and a mountpoint of a file system of the storage device.

Additionally or alternatively, the trap object may comprise one or more specific storage blocks of the storage device with the one or more specific storage blocks being determined at least in part by the file system of the storage device.

The ransomware detector in some embodiments is configured to generate the alert responsive to at least one of a detected attempt to modify the trap object, a detected attempt to delete the trap object and a detected attempt to relocate the trap object.

The generation of the alert in some embodiments automatically triggers at least one remedial action within the storage device. Examples of such remedial actions include halting write operations within the storage device, running one or more scripts within the storage device, initiating a security investigation, initiating a recovery from an existing backup of the storage device and initiating generation of an unscheduled backup of the storage device, as well as combinations of these and other remedial actions.

The alert may be transmitted by the storage device over a network to a processing device of a network security system.

A given storage device configured with functionality for automated detection and remediation of ransomware may be part of a computer network that includes the network security system.

A given embodiment can additionally or alternatively be configured in accordance with a ransomware-resistant storage architecture. For example, a storage device may be configured with multiple storage tiers including a write-once read-many storage tier, a copy-on-write storage tier overlying the write-once read-many storage tier, and a cache storage tier overlying the copy-on-write storage tier. Data written to the cache storage tier is subsequently written from the cache storage tier to the copy-on-write storage tier which makes one or more copies of the data and generates metadata for each such copy. The data and its one or more copies are subsequently written from the copy-on-write storage tier to the write-once read-many storage tier. The storage tiers are thereby configured to provide resistance to ransomware attacks in the storage device.

These and other illustrative embodiments include, without limitation, methods, apparatus, systems, computer networks and computer program products comprising processor-readable storage media.

DETAILED DESCRIPTION

Illustrative embodiments of the present invention will be described herein with reference to exemplary computer networks and associated computers, storage devices and other types of processing devices of the networks. It is to be appreciated, however, that the invention is not restricted to use with the particular illustrative computer network and processing device configurations shown. Accordingly, the term "computer network" as used herein is intended to be broadly construed, so as to encompass, for example, any system comprising multiple networked processing devices.

Figure 1:
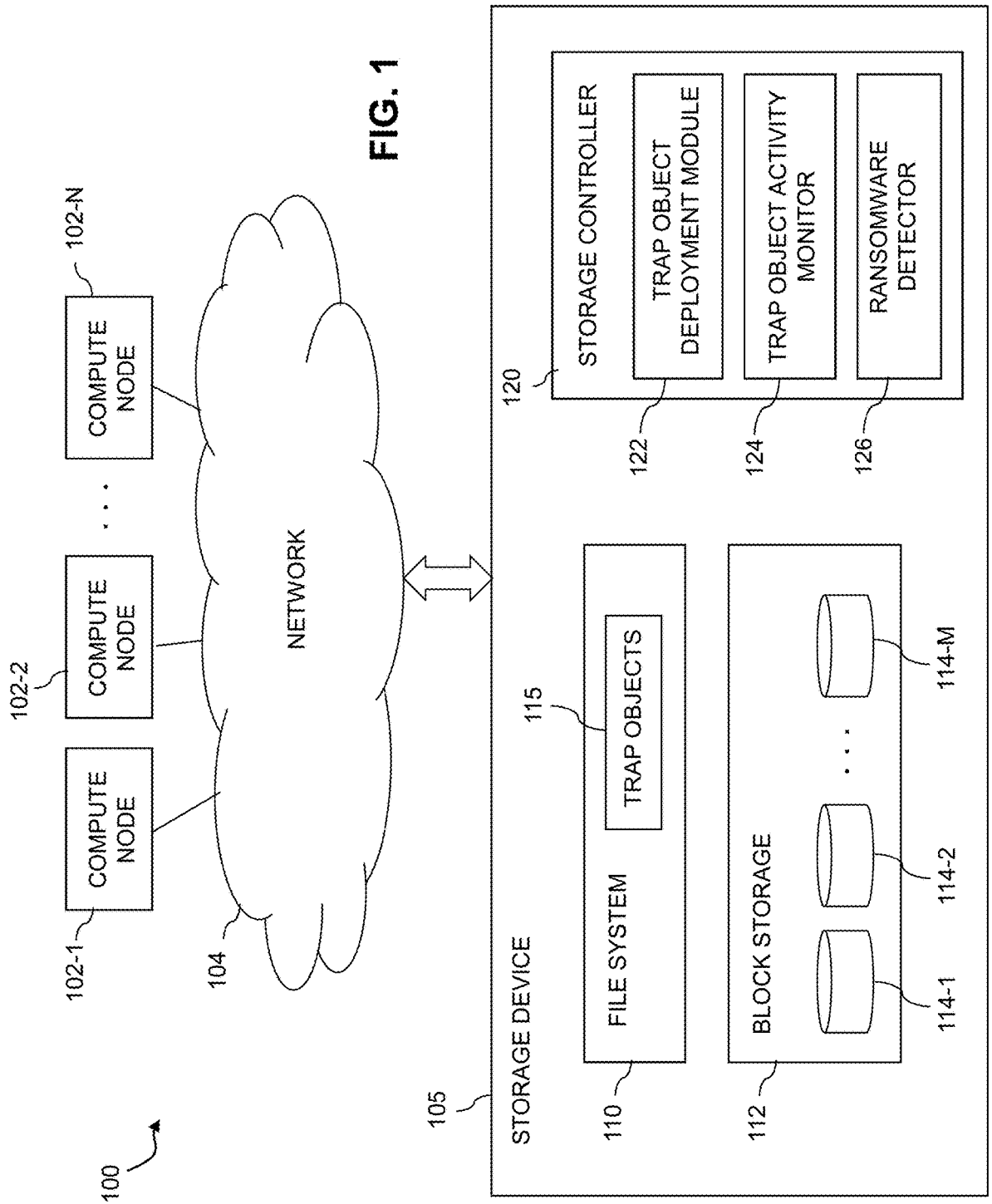
FIG. 1 is a block diagram of a computer network comprising a storage device configured for automated detection and remediation of ransomware attacks in an illustrative embodiment of the invention.

FIG. 1 shows a computer network 100 configured in accordance with an illustrative embodiment of the invention. The computer network 100 comprises a plurality of compute nodes 102-1, 102-2, . . . 102-N, collectively referred to herein as compute nodes 102. The compute nodes 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a storage device 105.

Each of at least a subset of the compute nodes 102 may be implemented in the form of one or more host devices configured to execute applications on behalf of one or more users of the computer network 100.

The compute nodes 102 may comprise, for example, mobile telephones, laptop computers, tablet computers, desktop computers or other types of devices capable of supporting user access to network resources. Such user devices are examples of what are more generally referred to herein as "processing devices." Some of these processing devices are also generally referred to herein as "computers."

The compute nodes 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also included in the computer network 100 is a storage device 105 comprising a file system 110 and block storage 112. The block storage 112 includes a plurality of distinct storage volumes 114-1, 114-2, . . . 114-M. The compute nodes 102 communicate with the storage device 105 over the network 104.

Although only a single storage device 105 is shown in the FIG. 1 embodiment, this embodiment and other embodiments disclosed herein can include multiple storage devices. A given storage device may be part of a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The storage device 105 can illustratively comprise a single storage array, storage disk, storage drive or other type of storage device within the computer network 100. Alternatively, the storage device 105 can comprise one or more storage systems each having multiple storage devices implemented therein. The term "storage device" as used herein is therefore intended to be broadly construed.

The storage device 105 in some embodiments may be co-located with the compute nodes 102, for example, within a particular data center or other facility of a given enterprise. Alternatively, the storage device 105 may be implemented in cloud infrastructure that is remote from the compute nodes 102.

Although not explicitly shown in the figure, one or more additional input-output devices may be associated with the storage device 105. Such input-output devices may be used to support one or more user interfaces to the storage device 105, as well as to support communication between the storage device 105 and other related systems and devices not explicitly shown. For example, in some embodiments, the storage device 105 may be configured to communicate with a security agent device or another component of an associated network security system. Such communications could occur over network 104 or possibly using other communication channels not illustrated in the figure. Security agent devices can illustratively comprise mobile telephones, laptop computers, tablet computers, desktop computers, or other types of computers or processing devices configured for communication with the storage device 105, possibly over network 104 or in some cases using other communication channels. For example, a given security agent device can comprise a mobile telephone equipped with a mobile application configured to receive alerts from the storage device 105 and to provide an interface for a security agent to select particular remedial measures for responding to the alert.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The storage device 105 in the FIG. 1 embodiment is assumed to be implemented using at least one processing device. Each such processing device generally comprises at least one processor and an associated memory, and implements one or more functional modules for controlling certain features of the storage device 105.

More particularly, the storage device 105 in this embodiment is assumed to comprise a processor coupled to a memory and a network interface, although such elements are not expressly shown in the figure.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory of the storage device 105 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface of the storage device 105 allows the storage device 105 to communicate over the network 104 with the compute nodes 102, and illustratively comprises one or more conventional transceivers.

The storage controller 120 in the present embodiment controls the deployment of a plurality of trap objects 115. Such trap objects are particularly configured for use in detection of a ransomware attack and are not otherwise utilized for storage of operational data in the storage device. The term "operational data" as used herein is intended to refer to data that is normally subject to read or write accesses or otherwise utilized during ordinary operation of legitimate applications, as distinguished from trap object data that is used for the purpose of detecting an on-going ransomware attack. Although the trap objects 115 are shown in the figure as being implemented in the file system 110, additional or alternative trap objects can be deployed in one or more of the storage volumes 114 of the block storage 112.

By way of example, a given one of the trap objects 115 can comprise a dummy file system element of the storage device 105, such as one or more of a file, a directory and a mountpoint of the file system 110.

As another example, additional or alternative trap objects deployed in the storage device 105 each comprise one or more specific storage blocks of the block storage 112 of the storage device 105. The one or more specific storage blocks of a given block storage based trap object in such an arrangement are illustratively determined at least in part by the file system 110 of the storage device 105.

The file system 110 in some embodiments comprises a file system such as XFS that allows a certain level of control over the location of the files by an administrator or other user. For example, it is possible using XFS to allocate specific blocks to a file and to make the file unmovable, such that the file location in block storage 112 is both known and unchangeable. Some embodiments utilize XFS or another similar type of file system to "pin" a trap object to a specific location in block storage 112 for the purpose of facilitating ransomware detection. For example, trap objects configured in this manner can be used to detect ransomware that attempts to relocate a file in conjunction with encrypting a file.

Other types of file system elements, storage blocks or other storage elements that are considered legitimate targets for ransomware may be utilized as trap objects.

The term "trap object" as used herein is therefore intended to be broadly construed. In some embodiments, trap objects are illustratively implemented in the form of what are also referred to herein as "honeypots," although numerous alternative arrangements of trap objects can be utilized.

The storage device 105 in the present embodiment further comprises a storage controller 120. The storage controller 120 includes a trap object deployment module 122, a trap object activity monitor 124, and a ransomware detector 126.

The components 122, 124 and 126 of the storage controller 120 can be implemented using various combinations of hardware, software and firmware. For example, in some embodiments, the ransomware detector 126 is implemented at least in part in firmware of the storage controller 120 of the storage device 105.

The trap object deployment module 122 is configured to determine an appropriate number and arrangement of trap objects to be deployed in the storage device 105 and to carry out the deployment of those trap objects.

In some embodiments, the trap object deployment module 122 operates in conjunction with an application running on a host device of one of the compute nodes 102. For example, a trap object setup and initialization process can be performed jointly by the trap object deployment module 122 of the storage device and an application running on a host device of one of the compute nodes 102.

In one example of an arrangement of this type, particular files of the file system 110 may be designated as trap objects by an administrator or other user of the storage device 105 via the trap object deployment module 122. Contents of the designated trap objects can be initialized by an administrator or other user of the application in order to disguise those trap objects as having content typical for the corresponding application. Such content designation can be carried out by the application through interaction with the trap object deployment module 122.

Numerous alternative arrangements are possible. For example, particular storage blocks of the block storage 112 may be designated as trap objects by an administrator or other user of the storage device 105 via the trap object deployment module 122. The storage blocks map to one or more files of the file system 110 under the control of the trap object deployment module 122 of the storage controller 120. Again, contents of the designated trap objects can be initialized by an administrator or other user of the application in order to disguise those trap objects as having content typical for the corresponding application, possibly through interaction with the trap object deployment module 122.

Various types of in-band or out-of-band communication can be used between the storage controller 120 and an application running on a host device of one of the compute nodes 102 in order to support application-based initialization of content for trap objects. However, it is also to be appreciated that the trap object deployment module 122 in some embodiments can be configured to initialize content for one or more of the trap objects without involvement of a corresponding application. For example, particular types of predetermined content may be automatically utilized for certain types of trap objects.

Also, it is possible for the trap object designation to be controlled primarily by one or more applications rather than primarily by the trap object deployment module 122. In an arrangement of this type, the applications illustratively interface with the storage controller 120 via the trap object deployment module 122.

Accordingly, in some embodiments, characteristics of a given trap object such as at least one of name, size and contents of the trap object are set by the storage controller 120 of the storage device 105. For example, this may involve the trap object deployment module 122 determining random settings of at least one of name, size and contents of the trap object.

Additionally or alternatively, in some embodiments, characteristics of a given trap object such as at least one of name, size and contents of the trap object are configurable by a user of the storage device 105 such as an application or an application administrator. For example, as indicated previously, an application can initialize the content of a trap object in order to disguise the trap object as having content typical for that application. Again, this may involve interaction between the host device of the application and the trap object deployment module 122 of the storage device 105.

The trap object activity monitor 124 is configured to monitor the trap objects 115 and other deployed trap objects of the storage device 105 in order to identify activity that may be associated with a ransomware attack. For example, the trap object activity monitor can identify the presence of write operations directed to a given trap object, as well as other types of activity relating to attempts to modify, delete or relocate the trap object. The trap object activity monitor 124 provides information relating to these and other types of identified activity to the ransomware detector 126 for further processing.

The ransomware detector 126 monitors the trap objects 115 in this case via information provided by the trap object activity monitor 124, although numerous other types of indirect or direct monitoring of the trap objects may be used. The ransomware detector 126 is further configured to generate one or more alerts based at least in part on a result of the monitoring of the trap objects.

For example, in some embodiments, the ransomware detector 126 is configured to periodically confirm at least one of integrity and location of a given trap object. In order to confirm integrity of the trap object, the ransomware detector 126 can compute an instance of a designated function of contents of the trap object and compare the instance to a previously-computed instance of the designated function of the contents of the trap object. The designated function may comprise a hash function, a checksum function or another type of function.

Additional or alternative types of detection can be implemented in the ransomware detector 126. For example, the ransomware detector 126 may be configured to detect one or more write operations directed to the trap object, or to detect various other types of attempts to modify, delete or relocate the trap object. These and other types of detection may be based at least in part on information provided by the trap object activity monitor 124. Alerts are generated by the ransomware detector 126 responsive to a determination that particular identified activities directed to the trap object have no authorized cause or other legitimate explanation and are therefore likely to be associated with a ransomware attack.

The ransomware detector 126 can be configured to detect multiple distinct types of ransomware, including ransomware that overwrites contents of an original file with ciphertext, ransomware that moves a file into a temporary directory, overwrites its contents there, and then moves the encrypted file back to the original location, potentially changing the file name in the process, and ransomware that reads the original file, creates a new file where it writes the encrypted contents of the original file, and then deletes the original file. It should be understood that these are only examples of types of ransomware that can be detected in illustrative embodiments, and should not be construed as limiting in any way.

The ransomware detector 126 in the present embodiment is assumed to be configured to detect a ransomware attack while the attack is in progress. For example, the object of the ransomware detector 126 may be to identify the attack as quickly as possible in order to minimize the damage to the storage volumes 114 of the block storage 112. A ransomware-resistant storage device configuration of the type to be described below in conjunction with FIGS. 6 and 7 may be used to limit or eliminate any damage that might otherwise occur prior to detection of the ransomware attack.

In a typical ransomware attack, the ransomware discovers a storage device and will start encrypting the data on that device. At some point, it will attempt to encrypt one of the trap assets and such an action will lead to generation of an alarm by the ransomware detector 126. The time to detection of the ransomware attack can be shortened by increasing the number of trap objects deployed on the storage device.

It is possible that legitimate encryption software running on one of the compute nodes 102 could inadvertently attempt to encrypt one of the trap objects 115 and thereby trigger a "false positive" alert. However, it is expected that in the normal lifecycle of a given storage device such an event will happen very infrequently, either at an initial configuration or when new security requirements trigger legitimate encryption as a one-time event.

In some embodiments, the storage device 105 comprising the ransomware detector 126 is configured to take one or more remedial actions responsive to generation of an alert. Such remedial actions may illustratively include one or more of halting write operations within the storage device, running one or more scripts within the storage device, initiating a security investigation, initiating a recovery from an existing backup of the storage device and initiating generation of an unscheduled backup of the storage device. A wide variety of additional or alternative remedial actions may be taken. Some of these remedial actions are taken directly by the storage device 105 without involvement of any external system or device. It is also possible for a given alert generated by the ransomware detector 126 to be transmitted by the storage device 105 over the network 104 or another communication channel to a processing device of a network security system.

Although shown as separate components in the FIG. 1 embodiment, components 122 and 124 may each be implemented at least in part internally to the ransomware detector 126. Accordingly, the term "ransomware detector" as used herein is intended to be broadly construed as to encompass a module or other component that includes functionality for configuration and deployment of trap objects as well as functionality for monitoring activity associated with deployed trap objects.

As noted above, the storage device 105 may be part of any of a variety of different types of storage platforms, including NAS or SAN storage platforms. In some embodiments, the storage device 105 comprises a NAS device having a storage controller comprising NAS device management and configuration software configured to permit an administrator of the storage device 105 to designate one or more user-configurable files of the trap object. Various characteristics such as name, size and contents of the trap object can be configured by the administrator or another user. For example, the name of a trap object can be set automatically to a typical randomly-selected name for a given data asset at build time, and an administrator or other user can subsequently change it to something more appropriate in the context of their organization at deployment time or at run time. The maximum number of trap objects that can be supported in a given storage device may also be subject to similar configuration. Alternatively, the maximum number of trap objects can be set at time of manufacture of the storage device by its original equipment manufacturer (OEM).

A given trap object can be configured such that once the trap object is initialized by a user it can only be reset by an administrator or other appropriate security personnel. Various remedial actions associated with a given ransomware alert can also be configured by an administrator or other security personnel. Such remedial actions may include "raise alarm," "run script," "halt," and numerous others.

In other embodiments, the storage device 105 comprises an SAN device having a storage controller comprising SAN device management and configuration software configured to permit an administrator or other user to designate one or more specific storage blocks of the trap object. In an embodiment of this type, a user could run an OEM-provided software application that would control association of trap object files with trap object storage blocks and also allow the user to initialize trap objects utilizing user-specified content. Other parameters can be configured in a manner similar to that described above for the NAS device embodiments. Numerous storage device configurations other than the above-described NAS and SAN device embodiments are possible.

It is to be appreciated that the particular arrangement of components 122, 124 and 126 of the storage controller 120 as shown in the FIG. 1 embodiment is presented by way of example only, and alternative arrangements can be used in other embodiments. Moreover, the particular set of computer network elements shown in the embodiment of FIG. 1 for automatically detecting and remediating ransomware attacks involving one or more storage devices is presented by way of illustrative example only, and in other embodiments additional or alternative computer network elements may be used. Thus, another embodiment may include additional or alternative systems, devices and other network entities, as well as different arrangements of modules and other components.

By way of example, in other embodiments, the storage device 105 can be implemented in a distributed manner, with particular modules or other components thereof being distributed over multiple processing devices of the computer network 100.

In some embodiments, the storage device 105 is configured to communicate with a network security system, such as, for example, a security operations center (SOC) or a critical incident response center (CIRC).

Additionally or alternatively, the storage device 105 can be configured to communicate with an otherwise conventional security analytics system, such as the RSA Security Analytics system commercially available from RSA, The Security Division of EMC Corporation of Hopkinton, Mass.

Other embodiments can implement the storage device 105 and its associated ransomware detector 126 to communicate with a security information and event management (SIEM) system, such as an enVision® platform, also commercially available from RSA. Such an STEM system is also considered another possible example of a "network security system" as that term is broadly used herein.

In some embodiments, alerts generated by the ransomware detector 126 may be provided to a network security tool, such as an Enterprise Compromise Assessment Tool (ECAT), commercially available from RSA, The Security Division of EMC Corporation of Hopkinton, Mass.

An exemplary process utilizing ransomware detector 126 of the storage device 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 208. These steps are assumed to be performed primarily by the storage controller 120 and its components 122, 124 and 126, operating in conjunction with other storage device components such as the file system 110, the block storage 112 and the trap objects 115, although the process can be implemented in numerous other ways. For example, the process can be implemented in other storage devices having different storage controller and ransomware detector configurations than those of the illustrative embodiment of FIG. 1.

In step 200, multiple trap objects are deployed in a storage device. The trap objects are particularly configured for use in detection of a ransomware attack and not otherwise utilized for storage of operational data in the storage device.

In step 202, the trap objects are monitored for activity likely to be associated with a ransomware attack. For example, monitoring a given trap object for activity may involve periodically confirming at least one of integrity and location of the trap object.

Additionally or alternatively, monitoring a given trap object for activity may comprise computing an instance of a designated function of contents of the trap object and comparing the instance to a previously-computed instance of the designated function of the contents of the trap object. The designated function in some embodiments comprises a hash function, a checksum function or combinations of these or other functions.

Numerous other trap object monitoring techniques may be used. For example, monitoring a given trap object for activity may comprise identifying one or more write operations directed to the trap object.

In some embodiments, such as that of FIG. 1, activity monitoring and ransomware detection are illustratively separated into separate functional components. For example, in such an embodiment, an activity monitor can provide information regarding identified activity to a ransomware detector for further processing. In other embodiments, both activity monitoring and ransomware detection can be performed by a single module of a storage controller of a storage device.

In step 204, an alert is generated based at least in part on a result of the monitoring. For example, the alert may be generated responsive to at least one of a detected attempt to modify the trap object, a detected attempt to delete the trap object and a detected attempt to relocate the trap object.

The generation of the alert in the present embodiment is assumed to automatically trigger at least one remedial action within the storage device. Examples of such remedial actions include halting write operations within the storage device, running one or more scripts within the storage device, initiating a security investigation, initiating a recovery from an existing backup of the storage device and initiating generation of an unscheduled backup of the storage device.

Additionally or alternatively, the alert may be transmitted by the storage device over a network to a processing device of a network security system. For example, the alert may be generated and provided to a security agent device such that the security agent device can determine one or more remedial actions to be taken. Alerts can be generated using any of a wide variety of different formats and protocols.

In place of or in addition to transmission of an alert to a security agent device, automated processing may be applied to an alert in at least one processing device of an SOC, CIRC, SIEM system, or other type of network security system. Alerts can therefore be used to trigger actions such as generation of a security ticket or transmission to an incident response team or associated console or application.

The automated remedial actions can illustratively include, for example, quarantining one or more of the compute nodes 102 that are suspected as being infected with ransomware, or attempting to capture a cryptographic key utilized to encrypt files as part of an on-going ransomware attack.

In some embodiments, multiple alerts can be generated and subject to different types of processing within the computer network.

In step 206, a determination is made as to whether or not the current number and arrangement of deployed trap objects remains appropriate. If no adjustment in the number and arrangement of deployed trap objects is needed, the process returns to step 202 as indicated in order to continue to monitor the existing trap objects for activity. Otherwise, the number and arrangement of trap objects is adjusted in step 208, and the process then returns to step 202 to monitor the adjusted trap objects for activity.

Figure 2:
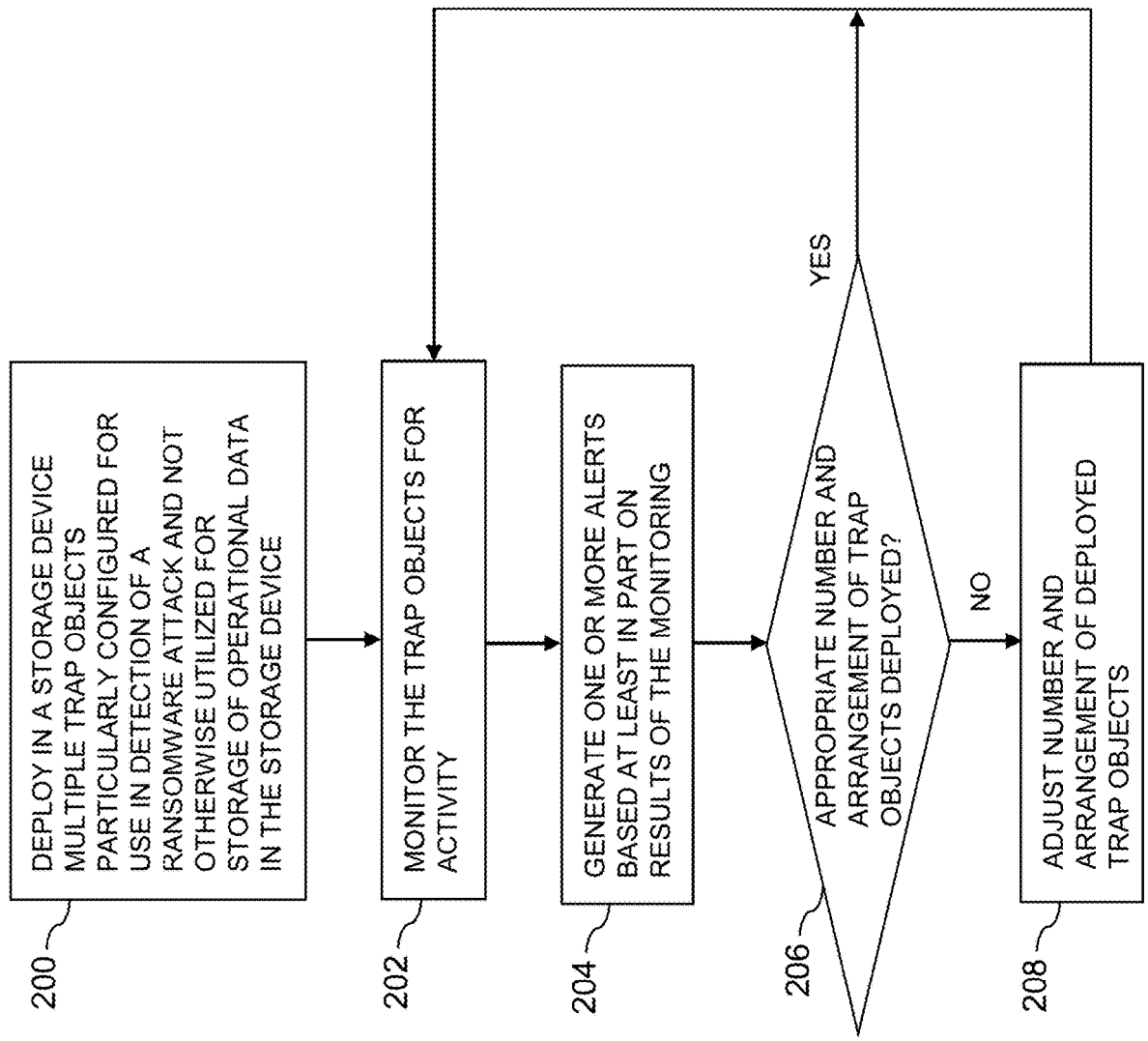
FIG. 2 is a flow diagram of a process for automated detection and remediation of ransomware attacks in an illustrative embodiment.

It should be understood that additional instances of steps 200 through 208 of the FIG. 2 process can be performed for different sets of trap objects, possibly on different storage devices, or may otherwise be repeated periodically in order to ensure that ransomware attacks are accurately and efficiently detected within the computer network 100.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect ransomware attacks and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of ransomware attack detection for different sets of trap objects or different storage devices.

Additional illustrative embodiments of storage devices and associated processes for automated detection and remediation of ransomware attacks will now be described with reference to FIGS. 3, 4 and 5.

Figure 3:
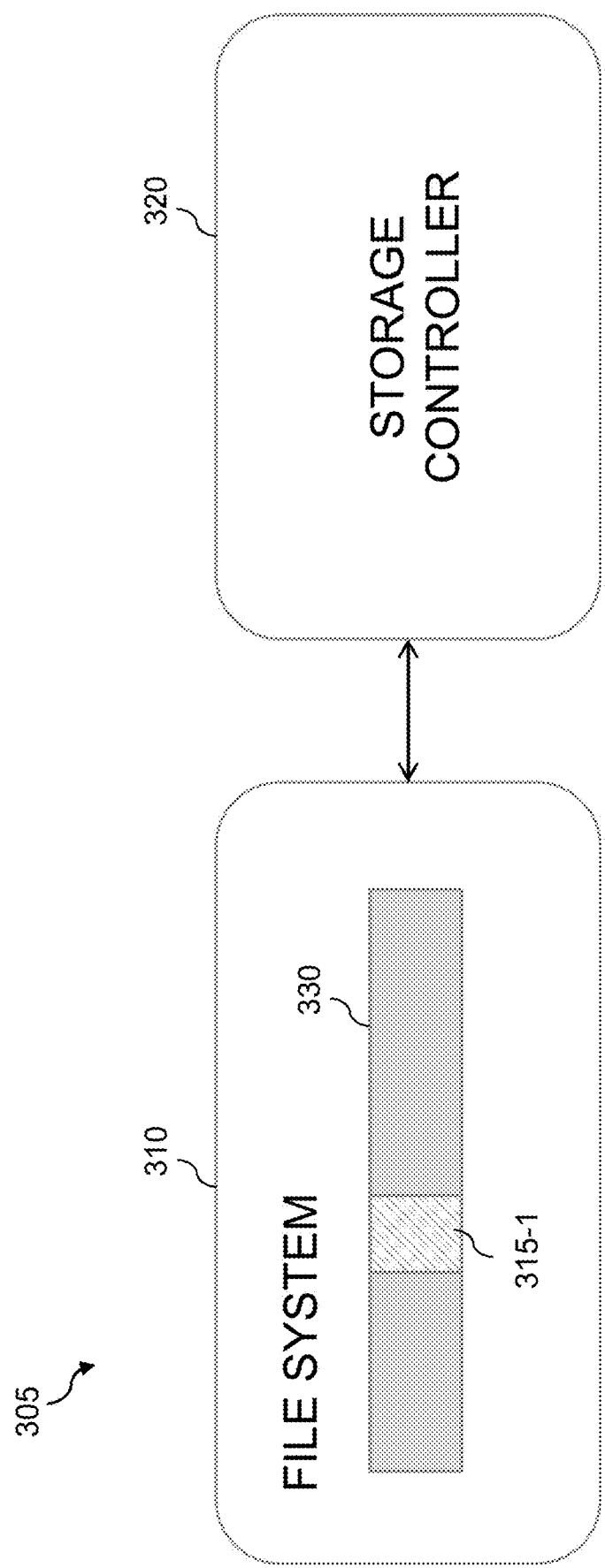
FIGS. 3 and 4 show examples of deployment of a trap object in a storage device in other illustrative embodiments.

Referring initially to FIG. 3, a storage device 305 comprises a file system 310 and a storage controller 320. The file system 310 comprises a trap object 315-1 that is incorporated into a file system directory 330. The trap object 315-1 is illustratively a particular file or set of files of the file system directory 330 and is an example of what is also referred to herein as a "dummy file system element." Other arrangements of trap objects comprising at least portions of one or more dummy file system elements can be used in other embodiments. The configuration and placement of the trap object 315-1 within the directory 330 of the file system 310 is illustratively controlled by the storage controller 320. The storage controller 320 also implements a ransomware detector that detects the presence of a ransomware attack in progress based at least in part on results of monitoring the file system trap object 315-1. The storage device 305 illustratively comprises a storage array although other types of storage devices can be used.

The FIG. 3 embodiment is an example of an arrangement in which a given trap object comprises a file or other component of a file system. In other embodiments, the trap object may comprise one or more specific storage blocks of a storage device. An example of such an arrangement is shown in FIG. 4.

Figure 4:
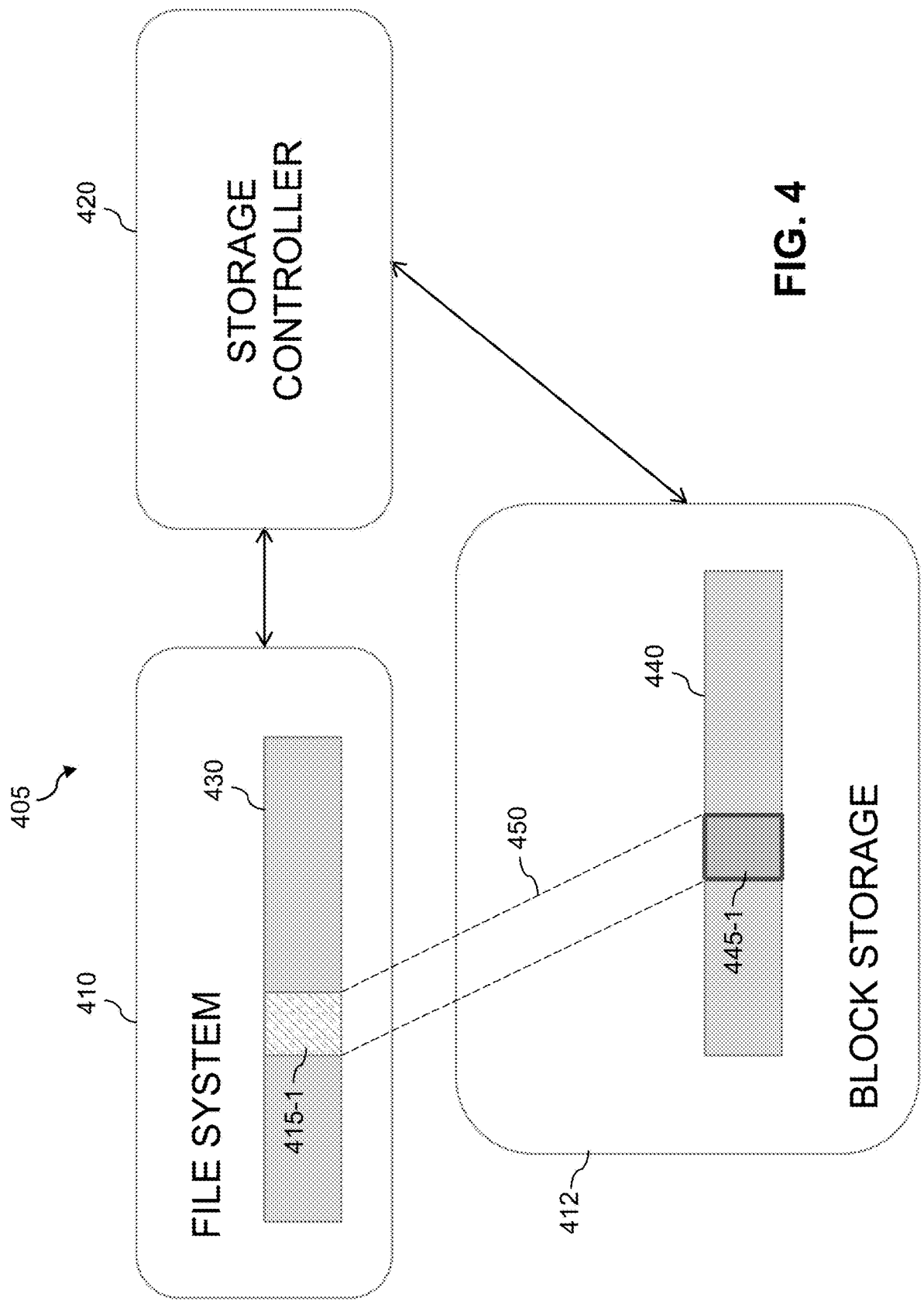

In the FIG. 4 embodiment, a storage device 405 comprises a file system 410, block storage 412 and a storage controller 420. The file system 410 comprises a trap object 415-1 that is incorporated into a file system directory 430. The trap object 415-1 may be a particular file or set of files of the file system directory 430. However, the trap object 415-1 in this embodiment is mapped to a corresponding trap object 445-1 of a particular storage drive 440 of the block storage 412. The configuration and placement of the trap object 415-1 within the directory 430 of the file system 410 is illustratively controlled by the storage controller 420, but the file system 410 controls a mapping 450 of the file system trap object 415-1 to the block storage trap object 445-1. The storage controller 420 illustratively implements a ransomware detector that detects the presence of ransomware based at least in part on results of monitoring the block storage trap object 445-1. Again, other arrangements of trap objects comprising at least portions of one or more storage blocks can be used in other embodiments.

The FIG. 4 embodiment utilizes the known mapping 450 between file system trap object 415-1 and block storage trap object 445-1 to facilitate the detection of a ransomware attack in progress. In some implementations of this embodiment, the trap object storage blocks of the block storage 412 may be predetermined and made accessible to the file system 410 via an application programming interface (API). The file system can use the API to map trap object files into the trap object storage blocks.

In the embodiments of FIGS. 3 and 4, additional trap objects may be deployed in the storage devices 305 and 405 in a manner similar to the particular trap objects 315-1, 415-1 and 445-1 illustrated in the figures. Selection of an appropriate number and arrangement of trap objects for deployment on a given storage device may involve a tradeoff of the amount of storage device memory and computational resources allocated to trap objects and their associated processing overhead against the amount of time that would be required to detect a ransomware attack. For example, inclusion of a large number of trap objects distributed throughout the storage device would tend decrease the amount of time required to detect a ransomware attack but would consume additional memory and computational resources.

Selection of an appropriate number and arrangement of trap objects to be deployed within a given storage device may additionally or alternatively involve a tradeoff of a recovery period objective, specifying a maximum time period for which data might be lost, against a recovery time objective specifying a targeted duration of time and a service level within which data must be restored.

Accordingly, the particular number and arrangement of trap objects in a given embodiment can be determined based on the specific needs of that embodiment. The number and arrangement of trap objects can be varied over time as those requirements change, as was illustrated in steps 206 and 208 of the FIG. 2 embodiment.

Figure 5:
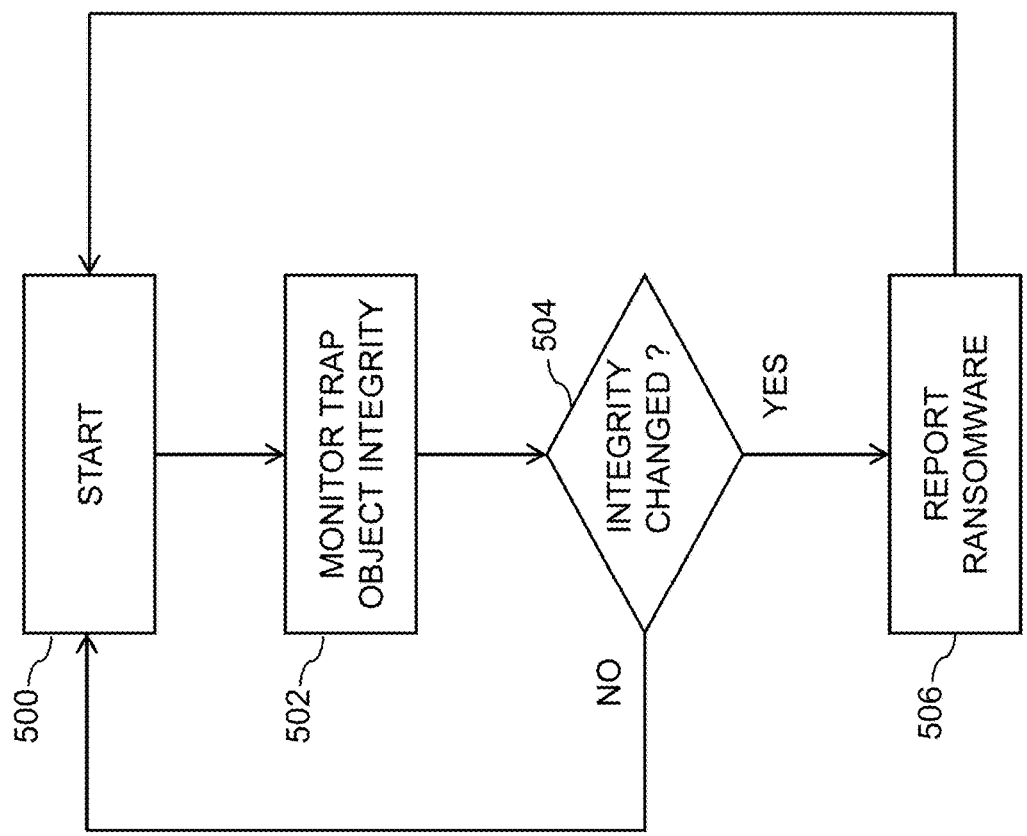
FIG. 5 is a flow diagram of another process for automated detection and remediation of ransomware attacks in an illustrative embodiment.

FIG. 5 shows an example process for automated detection and remediation of ransomware attacks in an illustrative embodiment. The FIG. 5 process may be implemented in either or both of the embodiments of FIGS. 3 and 4. The process is described for a single trap object illustratively corresponding to one of the trap objects 315-1, 415-1 or 445-1, but is assumed to be repeated for each of the trap objects deployed within the storage device in a given embodiment.

In step 500, the process starts after appropriate setup and initialization of one or more trap objects deployed within a file system or block storage of a storage device.

In step 502, a given one of the deployed trap objects is monitored for integrity. The term "integrity" is intended to be broadly construed so as to encompass any characteristic of the trap object that may be violated by an unauthorized access or attempted access to the trap object by ransomware in the course of a ransomware attack.

In step 504, a determination is made as to whether or not the integrity of the trap object has changed. For example, an attempt may have been made to modify, delete or relocate the trap object. If the integrity of the trap object has changed, the process moves to step 506 to report a detected instance of ransomware. Otherwise, the process returns to step 500 to continue to monitor the deployed trap object.

Other embodiments can utilize alternative monitoring, detecting and alerting operations. For example, in some embodiments involving deployment of multiple trap objects, an alert may be generated only after a change in the integrity of a specified threshold number of the trap objects that is more than one but less than all of the trap objects.

The above-described embodiments implement mechanisms for detection of a ransomware attack that is in progress. Other embodiments to be described below in conjunction with FIGS. 6 and 7 advantageously provide a ransomware-resistant configuration for a storage device that limits the amount of damage to stored data that might otherwise occur prior to the detection of the ransomware attack.

Figure 6:
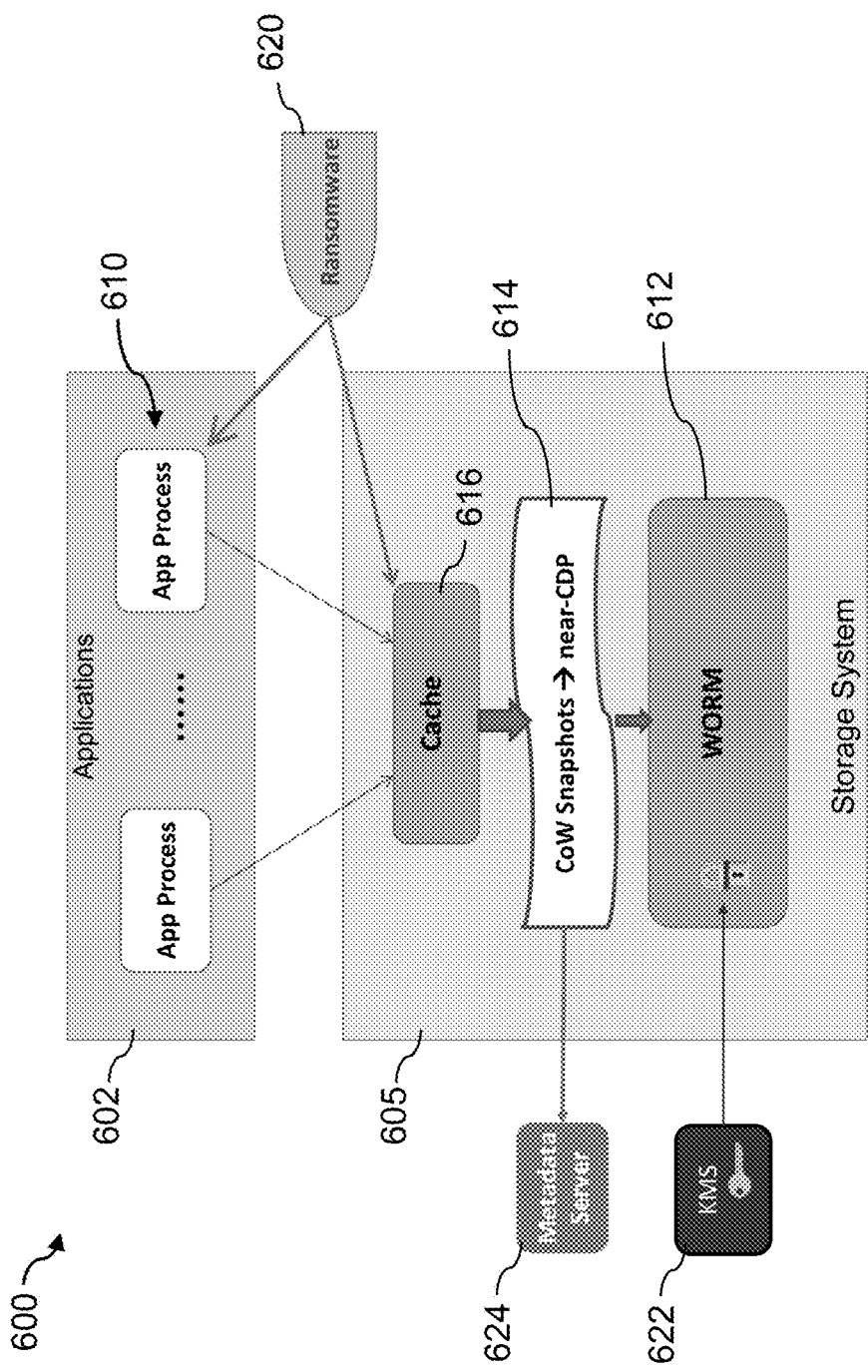
FIGS. 6 and 7 are diagrams showing a ransomware-resistant configuration of a multi-tier storage device in an illustrative embodiment.

Referring now to FIG. 6, a computer network 600 comprises a set of applications 602 running on one or more compute nodes. The computer network 600 further comprises a storage system 605 that stores data utilized by the applications 602. The applications 602 include multiple application processes 610 as illustrated. The storage system 605 comprises at least one multi-tier storage device having a ransomware-resistant configuration. More particularly, the multi-tier storage device in this embodiment comprises a write-once read-many (WORM) storage tier 612, a copy-on-write (COW) storage tier 614 overlying the WORM storage tier 612, and a cache storage tier 616 overlying the COW storage tier 614.

Data written to the cache storage tier 616 by the application processes 610 is subsequently written from the cache storage tier 616 to the COW storage tier 614 which makes one or more copies of the data. The COW storage tier 614 also generates metadata for each such copy of the data. The data and its one or more copies are subsequently written from the COW storage tier 614 to the WORM storage tier 612. Such an arrangement advantageously provides resistance to ransomware attacks in the storage device. This includes resistance to ransomware 620 that interacts with the application processes 610 and the cache storage tier 616, as well as other types of ransomware.

The computer network 600 further comprises a key management system (KMS) 622 configured to communicate with the WORM storage tier 612. Data stored in the WORM storage tier 612 is encrypted using one or more encryption keys provided by the KMS 622 such that the encrypted data can be effectively destroyed in the WORM storage tier 612 through deletion of the corresponding encryption key.

Also included in the computer network 600 is a metadata server 624 configured to communicate with the COW storage tier 614. The metadata server 624 stores metadata characterizing the copies made by the COW storage tier 614 and enforces policies for generation of those copies by the COW storage tier 614.

The storage tiers 612, 614 and 616 of the FIG. 6 embodiment collectively implement a multi-tier storage architecture that is resistant to irreversible modifications of stored data by ransomware. It renders ransomware ineffective by providing one or more additional paths to recover data that may have been subject to a ransomware attack without the need for the corresponding ransomware encryption key. For example, the storage architecture eliminates the possibility of an entire data set being overwritten with a cyphertext version during a ransomware attack, while also maintaining the desired read-write properties of the storage device for application purposes, such as meeting performance requirements and allowing data to be destroyed for legitimate reasons.

Figure 7:
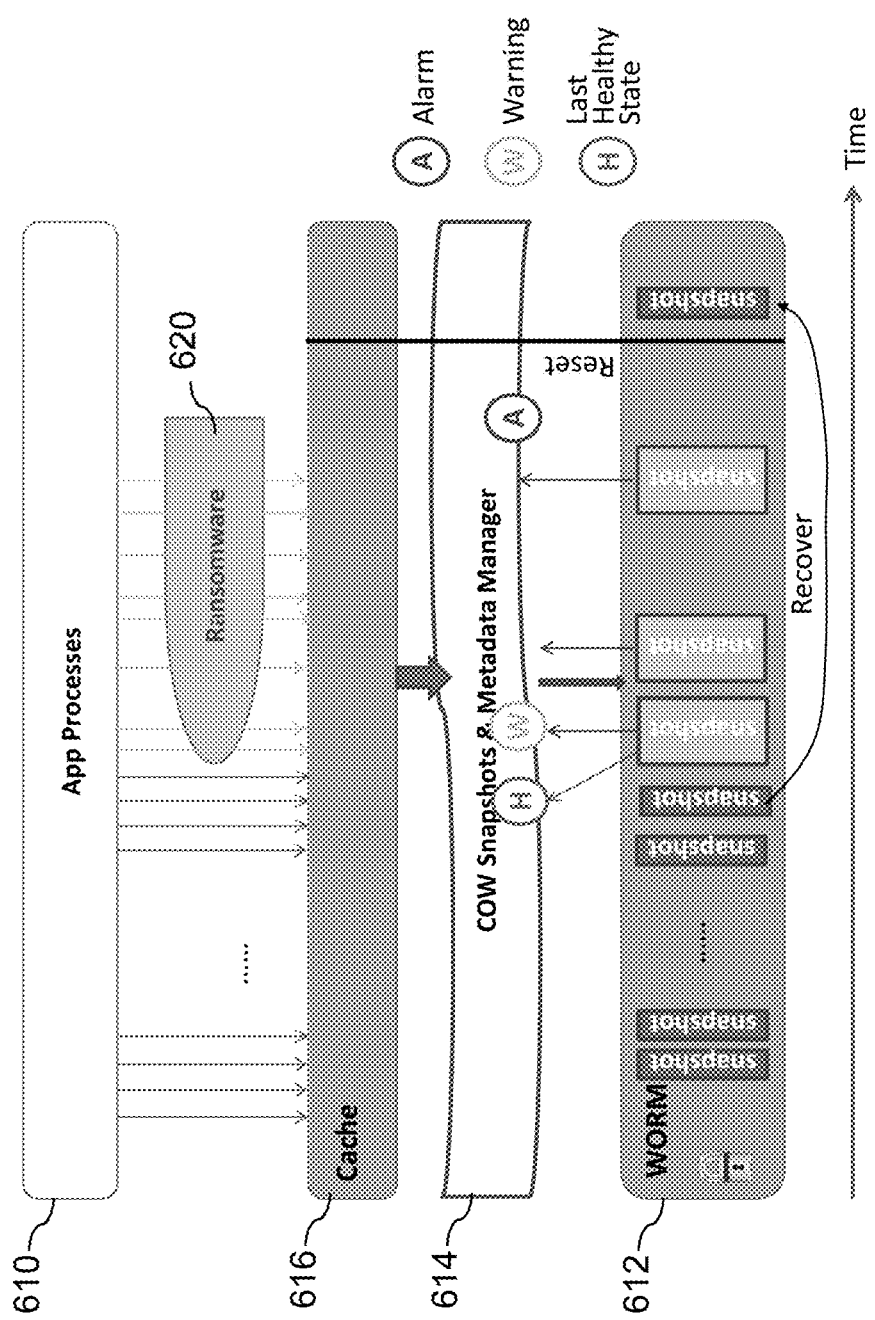

In the FIG. 6 embodiment, the WORM storage tier 612 ensures that the stored data cannot be overwritten with an encrypted version of itself and the COW storage tier 614 emulates the desired full read-write capabilities of the storage device. More particularly, each time the data is overwritten, the COW storage tier 614 creates a new copy of the data, while also keeping the old data as the previous version of the data. There is no limit on how many versions of data are kept, subject to the capacity of the storage system 605. These different versions are written to the WORM storage tier 612 as "snapshots" provided by the COW storage tier 614, as illustrated in the diagram of FIG. 7. As WORM storage is typically slow, the cache storage tier 616 is configured to ensure that application performance requirements are met. The cache storage tier 616 comprises regular read-write storage, in which data resides temporarily until it is written through into the WORM storage tier 612 via the COW storage tier 614. In some embodiments, multiple cache storage tiers may be used.

Encryption is utilized in order to allow data stored in the storage device to be legitimately destroyed for compliance, privacy or other reasons. Such encryption is based on one or more keys provided by the KMS 622 to the WORM storage tier 612 and provides data erasure functionality in the WORM storage tier 612. For example, each object stored in the WORM storage tier 612 may be encrypted using a different data encryption key (DEK) provided by the KMS 622. In order to erase the object for legitimate reasons, the DEK used to encrypt that object is deleted from the WORM storage tier 612 and the KMS 622, thereby rendering the data object unusable and effectively destroying it.

The encryption is performed in the WORM storage tier 612 so as to minimize the impact of encryption on performance. The KMS 622 can be configured to define one or more encryption policies and to deliver the appropriate keys as needed in accordance with the defined policy or policies. For example, encryption policies defined by the KMS 622 may specify encryption on a per-snapshot basis, a per-backup basis, or based on a particular group of snapshots or backups. Although it is possible that the KMS 622 may itself be subject to a ransomware attack, it has a significantly reduced attack surface and is therefore easier to defend from such attacks than the entire storage system 605.

The manner in which snapshots are generated by the COW storage tier 614 for storage in the WORM storage tier 612 can be controlled by the metadata server 624 subject to one or more established policies. By making the update interval sufficiently small, a near-CDP ("continuous data protection") implementation can be provided. The metadata server 624 can also perform various additional functions such as storing snapshot metadata and performing metadata analysis in order to detect abnormal data flows. The metadata server 624 may include internal WORM storage for storing such metadata.

In normal operation in the absence of a ransomware attack, the application processes 610 read data from the cache storage tier 616. The cache storage tier 616 fetches the most recent copy of the data from the WORM storage tier 612 via the COW storage tier 614. The application processes 610 write data to the cache storage tier 616. The COW storage tier 614 creates snapshots of the written data from the cache storage tier 616 and writes those snapshots to the WORM storage tier 612 while also sending the corresponding snapshot metadata to the metadata server 624. The WORM storage tier 612 encrypts the snapshots using DEKs from the KMS 622. The metadata server can update the COW snapshot policies in real time, and additionally or alternatively can implement periodic updates. It can also analyze the snapshot metadata and update the health status of the data flow in real time.

As illustrated in FIG. 7, in conjunction with an on-going attack by ransomware 620, the metadata server 624 detects one or more abnormal snapshots and generates a warning while also recording the last healthy state of the snapshot data. An alarm is raised if the amount of abnormal metadata exceeds a specified threshold. If an automatic recovery policy is specified, the metadata server 624 can direct the COW storage tier 614 to recover the snapshot data from its recorded last healthy state. Additional actions such as resetting the storage system 605 and clearing the cache storage tier 616 can also be performed. By analyzing the snapshot metadata and defining action policies, the metadata server 624 is able to detect abnormal data flows at early stage and facilitate automatic or manual data recovery.

The multi-tier storage architecture illustrated in FIGS. 6 and 7 can be used in a given storage device to supplement the ransomware protection provided by the ransomware detector 126 of the FIG. 1 embodiment.

The multi-tier storage architecture is applicable to both primary storage and backup storage, although the particular arrangement of storage tiers utilized in a given embodiment may be varied depending upon the potentially differing performance requirements of primary and backup storage. For example, a backup storage system could utilize low-cost removable WORM media that can be discarded when no longer needed. All data on the media that is no longer needed would be encrypted using DEKs that have been deleted so that the media itself would not have to be destroyed.

The above-described illustrative embodiments provide significant advantages relative to conventional approaches.

For example, some embodiments are configured to provide particularly accurate and efficient detection of on-going ransomware attacks by being implemented directly on storage devices rather than on user devices. Such an arrangement advantageously allows for earlier detection of on-going ransomware attacks than would otherwise be possible using conventional techniques, thereby helping to minimize the damage that the ransomware attack can inflict on the computer network.

Illustrative embodiments allow ransomware detection to be implemented without the need for any behavioral analysis. In addition, ransomware can be detected even where there is no change in data entropy as a result of a ransomware attack. Furthermore, the ransomware detection can be implemented in illustrative embodiments without any modification to user devices or their associated applications.

Some embodiments are configured to detect ransomware that does not have a known behavioral "signature" and would therefore be undetectable by conventional anti-malware programs. For example, these embodiments can detect ransomware implementing slow and insidious attacks that encrypt data in small increments, mimicking the input-output patterns of legitimate applications.

Some embodiments are additionally or alternatively configured with a ransomware-resistant storage architecture that limits the amount of damage to stored data that can occur prior to detection of an on-going ransomware attack.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements.

The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, storage devices and other types of processing devices.

The processing devices and other computer network components referred to herein can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of storage devices, file systems, storage controllers, ransomware detectors, trap objects and other components can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. An apparatus comprising:
a storage device comprising a processor coupled to a memory;
the storage device incorporating at least one trap object particularly configured for use in detection of a ransomware attack and not otherwise utilized for storage of operational data in the storage device;
wherein the storage device further comprises a ransomware detector configured to monitor the trap object and to generate an alert based at least in part on a result of the monitoring;
wherein the ransomware detector is configured to confirm integrity of the trap object by computing an instance of a designated function of contents of the trap object and comparing the instance to a previously-computed instance of the designated function of the contents of the trap object, the designated function comprising at least one of a hash function and a checksum function; and
wherein the ransomware detector is configured to generate the alert responsive to detection of a difference between a result of a first application of the designated function to the contents of the trap object and a result of a second application of the designated function to the contents of the trap object, in conjunction with the comparing of the computed instances;
the detection of a difference between the results of the first and second applications of the designated function to the contents of the trap object being indicative of presence of ransomware;
the integrity of the trap object and an absence of ransomware being indicated by an absence of a difference between the results of the first and second applications of the designated function to the contents of the trap object.

2. The apparatus of claim 1 wherein the storage device comprises a storage array and wherein the ransomware detector is implemented at least in part in firmware of a storage controller of the storage array.

3. The apparatus of claim 1 wherein the trap object comprises at least one of:
a dummy file system element of the storage device including one or more of a file, a directory and a mountpoint of a file system of the storage device; and
one or more specific storage blocks of the storage device wherein the one or more specific storage blocks are determined at least in part by the file system of the storage device.

4. The apparatus of claim 1 wherein the ransomware detector is configured to periodically confirm at least one of integrity and location of the trap object.

5. The apparatus of claim 1 wherein the ransomware detector is configured to detect one or more write operations directed to the trap object.

6. The apparatus of claim 1 wherein at least one of name, size and contents of the trap object is set randomly by the storage device.

7. The apparatus of claim 1 wherein at least one of name, size and contents of the trap object is configurable by a user of the storage device.

8. The apparatus of claim 1 wherein the storage device comprises a network-attached storage (NAS) device having a storage controller comprising NAS device management and configuration software configured to permit an administrator of the storage device to designate one or more user-configurable files of the trap object.

9. The apparatus of claim 1 wherein the storage device comprises a storage area network (SAN) device having a storage controller comprising SAN device management and configuration software configured to permit an administrator to designate one or more specific storage blocks of the trap object.

10. The apparatus of claim 1 wherein the ransomware detector is configured to generate one or more additional alerts responsive to at least one of a detected attempt to modify the trap object, a detected attempt to delete the trap object and a detected attempt to relocate the trap object.

11. The apparatus of claim 1 wherein generation of the alert automatically triggers at least one remedial action within the storage device and wherein said at least one remedial action comprises one or more of halting write operations within the storage device, running one or more scripts within the storage device, initiating a security investigation, initiating a recovery from an existing backup of the storage device and initiating generation of an unscheduled backup of the storage device.

12. An apparatus comprising:
a storage device comprising a processor coupled to a memory;
the storage device incorporating at least one trap object particularly configured for use in detection of a ransomware attack and not otherwise utilized for storage of operational data in the storage device;
wherein the storage device further comprises a ransomware detector configured to monitor the trap object and to generate an alert based at least in part on a result of the monitoring;
wherein the storage device further comprises:
a write-once read-many storage tier;
a copy-on-write storage tier overlying the write-once read-many storage tier; and
a cache storage tier overlying the copy-on-write storage tier;
wherein data written to the cache storage tier is subsequently written from the cache storage tier to the copy-on-write storage tier which makes one or more copies of the data and generates metadata for each such copy; and
wherein the data and its one or more copies are subsequently written from the copy-on-write storage tier to the write-once read-many storage tier;
the storage tiers thereby being configured to provide resistance to ransomware attacks in the storage device;
wherein the ransomware detector is configured to generate the alert responsive to detection of a difference between a result of a first application of a designated function to contents of the trap object and a result of a second application of the designated function to the contents of the trap object;
the detection of a difference between the results of the first and second applications of the designated function to the contents of the trap object being indicative of presence of ransomware;
integrity of the trap object and an absence of ransomware being indicated by an absence of a difference between the results of the first and second applications of the designated function to the contents of the trap object.

13. The apparatus of claim 12 further comprising a key management system configured to communicate with the write-once read-many storage tier of the storage device and wherein data stored in the write-once read-many storage tier is encrypted using one or more encryption keys provided by the key management system such that the encrypted data can be effectively destroyed in the write-once read-many storage tier through deletion of the corresponding encryption key.

14. The apparatus of claim 12 further comprising a metadata server configured to communicate with the copy-on-write storage tier of the storage device and wherein the metadata server stores metadata characterizing the copies made by the copy-on-write storage tier and enforces policies for generation of those copies by the copy-on-write storage tier.

15. A method comprising:
incorporating into a storage device at least one trap object particularly configured for use in detection of a ransomware attack and not otherwise utilized for storage of operational data in the storage device;
monitoring the trap object for activity; and
generating an alert based at least in part on a result of the monitoring;
wherein the storage device comprises a processor coupled to a memory;
wherein monitoring the trap object for activity comprises computing an instance of a designated function of contents of the trap object and comparing the instance to a previously-computed instance of the designated function of the contents of the trap object, the designated function comprising at least one of a hash function and a checksum function; and
wherein the alert is generated responsive to detection of a difference between a result of a first application of the designated function to the contents of the trap object and a result of a second application of the designated function to the contents of the trap object, in conjunction with the comparing of the computed instances;
the detection of a difference between the results of the first and second applications of the designated function to the contents of the trap object being indicative of presence of ransomware;
integrity of the trap object and an absence of ransomware being indicated by an absence of a difference between the results of the first and second applications of the designated function to the contents of the trap object.

16. The method of claim 15 wherein generating the alert based at least in part on a result of the monitoring comprises generating one or more additional alerts responsive to at least one of a detected attempt to modify the trap object, a detected attempt to delete the trap object and a detected attempt to relocate the trap object.

17. A computer program product comprising a non-transitory processor-readable storage medium having stored therein program code of one or more software programs, wherein the program code when executed by at least one processing device causes said at least one processing device:
to incorporate into a storage device at least one trap object particularly configured for use in detection of a ransomware attack and not otherwise utilized for storage of operational data in the storage device;
to monitor the trap object for activity; and
to generate an alert based at least in part on a result of the monitoring;
wherein monitoring the trap object for activity comprises computing an instance of a designated function of contents of the trap object and comparing the instance to a previously-computed instance of the designated function of the contents of the trap object, the designated function comprising at least one of a hash function and a checksum function; and
wherein the alert is generated responsive to detection of a difference between a result of a first application of the designated function to the contents of the trap object and a result of a second application of the designated function to the contents of the trap object, in conjunction with the comparing of the computed instances;
the detection of a difference between the results of the first and second applications of the designated function to the contents of the trap object being indicative of presence of ransomware;
integrity of the trap object and an absence of ransomware being indicated by an absence of a difference between the results of the first and second applications of the designated function to the contents of the trap object.

18. The computer program product of claim 17 wherein generating the alert based at least in part on a result of the monitoring comprises generating one or more additional alerts responsive to at least one of a detected attempt to modify the trap object, a detected attempt to delete the trap object and a detected attempt to relocate the trap object.

19. The computer program product of claim 17 wherein the storage device further comprises:
- a write-once read-many storage tier;
- a copy-on-write storage tier overlying the write-once read-many storage tier; and
- a cache storage tier overlying the copy-on-write storage tier;
- wherein data written to the cache storage tier is subsequently written from the cache storage tier to the copy-on-write storage tier which makes one or more copies of the data and generates metadata for each such copy; and
- wherein the data and its one or more copies are subsequently written from the copy-on-write storage tier to the write-once read-many storage tier;
- the storage tiers thereby being configured to provide resistance to ransomware attacks in the storage device.

20. The computer program product of claim 17 wherein generation of the alert automatically triggers at least one remedial action within the storage device and wherein said at least one remedial action comprises one or more of halting write operations within the storage device, running one or more scripts within the storage device, initiating a security investigation, initiating a recovery from an existing backup of the storage device and initiating generation of an unscheduled backup of the storage device.

* * * * *